(12) United States Patent
Li et al.

(10) Patent No.: US 11,372,491 B2
(45) Date of Patent: Jun. 28, 2022

(54) TOUCH SCREEN, MANUFACTURING METHOD THEREOF, AND TOUCH DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zewen Li, Beijing (CN); Hongqiang Luo, Beijing (CN); Kwanggyun Jang, Beijing (CN); Zhen Guo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/969,377

(22) PCT Filed: Nov. 4, 2019

(86) PCT No.: PCT/CN2019/115277
§ 371 (c)(1),
(2) Date: Aug. 12, 2020

(87) PCT Pub. No.: WO2021/087649
PCT Pub. Date: May 14, 2021

(65) Prior Publication Data
US 2021/0132721 A1    May 6, 2021

(51) Int. Cl.
*G06F 3/041*  (2006.01)
*G06F 3/044*  (2006.01)

(52) U.S. Cl.
CPC ............ *G06F 3/0412* (2013.01); *G06F 3/044* (2013.01); *G06F 2203/04103* (2013.01); *G06F 2203/04107* (2013.01)

(58) Field of Classification Search
CPC .................. G06F 3/0412; G06F 3/044; G06F 2203/04103; G06F 2203/04107; G06F 3/04164
See application file for complete search history.

(56) References Cited

U.S. PATENT DOCUMENTS

| | | | |
|---|---|---|---|
| 2004/0241904 A1* | 12/2004 | Lee | H05K 3/28 438/106 |
| 2013/0100039 A1* | 4/2013 | Hong | B32B 37/1207 345/173 |

(Continued)

*Primary Examiner* — Hong Zhou
(74) *Attorney, Agent, or Firm* — Dinsmore & Shohl LLP (57) ABSTRACT

The present disclosure provides a touch screen, a manufacturing method thereof, and a touch display device. The touch screen includes: a substrate; a touch layer and a bonding layer that are on a side of the substrate, the bonding layer being connected to the touch layer by a metal wire; a flexible circuit board connected to the bonding layer; a polarizer on a side of the touch layer away from the substrate and provided with a notch exposing the bonding layer and at least a portion of the metal wire; an insulating light-shielding strip covering the portion of the metal wire exposed by the notch and extending to a side of the polarizer close to the substrate; and a cover plate on a side of the polarizer away from the substrate and including a transparent window area and a shielding area around the transparent window area.

18 Claims, 10 Drawing Sheets

(56) References Cited

U.S. PATENT DOCUMENTS

| | | | |
|---|---|---|---|
| 2014/0362036 A1* | 12/2014 | Mo | G06F 3/044 |
| | | | 345/174 |
| 2016/0117032 A1* | 4/2016 | Lin | G06F 3/04164 |
| | | | 345/173 |
| 2017/0090661 A1* | 3/2017 | Kim | H01L 27/3276 |
| 2017/0228073 A1* | 8/2017 | Hagihara | G06F 3/04164 |
| 2020/0089347 A1* | 3/2020 | Baek | G06F 3/04164 |
| 2020/0159383 A1* | 5/2020 | Jeong | G06F 3/04164 |
| 2020/0382739 A1* | 12/2020 | Lu | G09G 5/10 |

\* cited by examiner

```
┌─────────────────────────────────────────────────┐  ─── S1
│  Manufacture an entire board comprising a       │
│  plurality of cutting units, wherein each of    │
│  the plurality of cutting units comprises a     │
│  touch layer and a bonding layer that are on a  │
│  side of a substrate, and the bonding layer is  │
│  connected to the touch layer by a metal wire   │
└─────────────────────────────────────────────────┘
                      ↓
┌─────────────────────────────────────────────────┐  ─── S2
│  Cut the plurality of cutting units along a     │
│  first cutting line to separate the plurality   │
│  of cutting units                               │
└─────────────────────────────────────────────────┘
                      ↓
┌─────────────────────────────────────────────────┐  ─── S3
│  Connect a flexible circuit board to the        │
│  bonding layer                                  │
└─────────────────────────────────────────────────┘
                      ↓
┌─────────────────────────────────────────────────┐  ─── S4
│  Form an insulating light-shielding strip on a  │
│  side of the metal wire away from the           │
│  substrate, wherein the insulating              │
│  light-shielding strip at least covers a        │
│  portion of the metal wire exposed by a notch   │
│  of a polarizer to be assembled                 │
└─────────────────────────────────────────────────┘
                      ↓
┌─────────────────────────────────────────────────┐  ─── S5
│  Attach the polarizer to the touch layer,       │
│  wherein the notch of the polarizer exposes     │
│  the flexible circuit board and at least a      │
│  portion of the insulating light-shielding strip│
└─────────────────────────────────────────────────┘
```

TOUCH SCREEN, MANUFACTURING METHOD THEREOF, AND TOUCH DISPLAY DEVICE

CROSS-REFERENCE TO RELATED APPLICATIONS

The present application is a U.S. National Stage Application under 35 U.S.C. § 371 of International Patent Application No. PCT/CN2019/115277, filed on Nov. 4, 2019, the disclosure of which is incorporated by reference herein in entirety.

TECHNICAL FIELD

The present disclosure relates to a touch screen, a manufacturing method thereof, and a touch display device.

BACKGROUND

With the development of science and technology, the demand for a screen of the display device is more and more diversified. For example, touch display products such as mobile phones and tablet computers are developing towards the direction of full screen.

Since the full screen technology requires that the screen-to-body ratio of the touch display device (that is, a ratio of an area of an effective display area of the screen to an area of the front of the screen) should be 95% or more, the narrow frame design becomes the key to the realization of the full screen technology.

SUMMARY

According to an aspect of embodiments of the present disclosure, a touch screen is provided. The touch screen comprises: a substrate; a touch layer and a bonding layer that are on a side of the substrate, wherein the bonding layer is connected to the touch layer by a metal wire; a flexible circuit board connected to the bonding layer; a polarizer on a side of the touch layer away from the substrate and provided with a notch exposing the bonding layer and at least a portion of the metal wire; an insulating light-shielding strip covering the at least a portion of the metal wire exposed by the notch and extending to a side of the polarizer close to the substrate; and a cover plate on a side of the polarizer away from the substrate and comprising a transparent window area and a shielding area around the transparent window area, wherein an orthographic projection of the touch layer on the cover plate is in the transparent window area, there is provided with a gap between the orthographic projection and the shielding area, and the insulating light-shielding strip comprises a portion exposed by the gap.

In some embodiments, a material of the insulating light-shielding strip comprises black ink.

In some embodiments, the insulating light-shielding strip further extends to a side of the flexible circuit board away from the substrate.

In some embodiments, a length of the insulating light-shielding strip is greater than a length of a bottom edge of the notch.

In some embodiments, the substrate comprises a touch area and a non-touch area on at least one side of the touch area; and along a direction from the touch area to the non-touch area, a width of an overlapping part of the insulating light-shielding strip and the polarizer is 150 micrometers to 200 micrometers, and a width of an overlapping part of the insulating light-shielding strip and the flexible circuit board is 150 micrometers to 200 micrometers.

In some embodiments, a thickness of the insulating light-shielding strip is 1 millimeter to 2 millimeters.

In some embodiments, the touch screen further comprises: an adhesive film between the polarizer and the cover plate, and a support pad between the flexible circuit board and the adhesive film.

In some embodiments, the flexible circuit board comprises: a board body with a hollow hole, and a liquid photo solder resist filled in the hollow hole.

In some embodiments, the substrate comprises a touch area and a non-touch area on at least one side of the touch area; and the touch layer is on the touch area, the bonding layer is on the non-touch area, and the metal wire extends from the touch area to the non-touch area.

In some embodiments, a width of the notch in a length direction of the insulating light-shielding strip gradually increases along a direction from the touch area to the non-touch area.

In some embodiments, along the direction from the touch area to the non-touch area, the width of the overlapping part of the insulating light-shielding strip and the polarizer is equal to the width of the overlapping part of the insulating light-shielding strip and the flexible circuit board.

According to another aspect of embodiments of the present disclosure, a touch display device is provided. The touch display device comprises: the touch screen according to any one of the foregoing solutions, and a display screen attached to the substrate of the touch screen.

In some embodiments, the touch display device comprises a display area and a non-display area around the display area; and the non-display area comprising: a first part, a second part adjacent to the first part, a third part opposite to the first part, and a fourth part opposite to the second part, wherein the flexible circuit board is provided on the first part, and a width of the first part is larger than a width of any one of the second part, the third part, or the fourth part.

In some embodiments, the width of the second part is equal to the width of the third part and equal to the width of the fourth part.

According to another aspect of the embodiments of the present disclosure, a manufacturing method for a touch screen is provided. The manufacturing method comprises: manufacturing an entire board comprising a plurality of cutting units, wherein each of the plurality of cutting units comprises a touch layer and a bonding layer that are on a side of a substrate, and the bonding layer is connected to the touch layer by a metal wire; cutting the plurality of cutting units along a first cutting line to separate the plurality of cutting units; connecting a flexible circuit board to the bonding layer; forming an insulating light-shielding strip on a side of the metal wire away from the substrate, wherein the insulating light-shielding strip at least covers a portion of the metal wire exposed by a notch of a polarizer to be assembled; and attaching the polarizer to the touch layer, wherein the notch of the polarizer exposes the flexible circuit board and at least a portion of the insulating light-shielding strip.

In some embodiments, the insulating light-shielding strip is formed by an inkjet printing process.

In some embodiments, the manufacturing method further comprises: forming a punching hole on a side of the bonding layer of each of the plurality of cutting units away from the touch layer before cutting the plurality of cutting units along the first cutting line, wherein the first cutting line passes through the punching hole to form an opening groove at the punching hole of each of the plurality of cutting units.

In some embodiments, the punching hole is a square hole, and the manufacturing method further comprises: cutting the each of the plurality of cutting units along a second cutting line after attaching the polarizer to the touch layer, wherein a starting point of the second cutting line is at one end of a bottom edge of the opening groove, and an ending point of the second cutting line is at another end of the bottom edge of the opening groove.

In some embodiments, the manufacturing method further comprises: attaching a support pad to the flexible circuit board after cutting the each of the plurality of cutting units along the second cutting line; attaching an adhesive film to the polarizer and the support pad; and attaching a cover plate to the adhesive film.

In some embodiments, the manufacturing method further comprises: defoaming the polarizer and the touch layer that are attached to each other after cutting the each of the plurality of cutting units along the second cutting line and before attaching the adhesive film to the polarizer and the support pad.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a particular device is located between a first device and a second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors of the present disclosure have found that, in a related art, the size of the frame of the touch display device is narrowed to a limit, which results in a series of poor appearance of the product. For example, a light reflection problem of a metal wire at an edge of the effective display area of the screen has become one of the main problems that harass those skilled in the art.

Figure 1A:
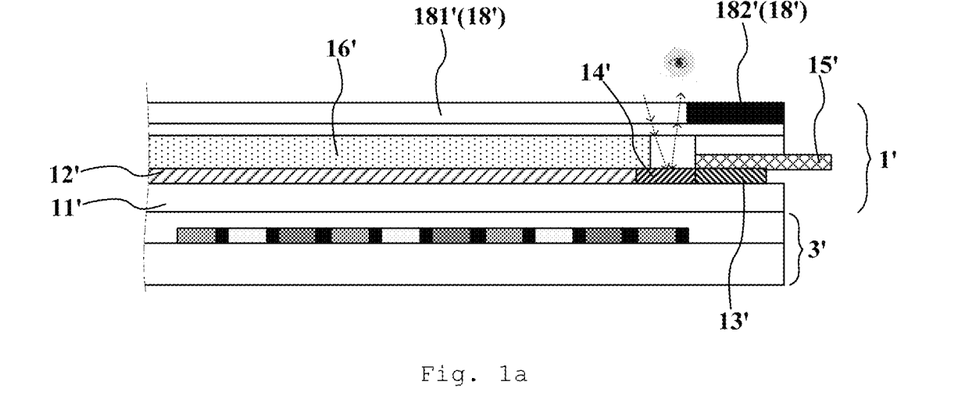
FIG. 1a is a partial cross-sectional schematic view of a touch display device in a related art.
Figure 1B:
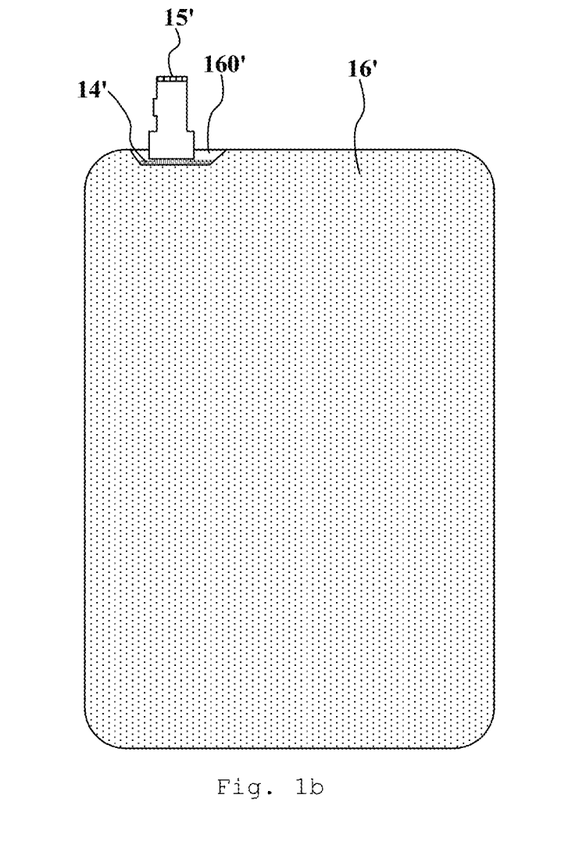
FIG. 1b is a schematic diagram showing that a flexible circuit board and a metal wire are exposed by a notch of a polarizer of a touch display device in a related art.

As shown in FIGS. 1a and 1b, a touch display device in the related art comprises a touch screen 1' and a display screen 3' attached to the touch screen 1'. A main structure of the touch screen 1' comprises a substrate 11', a touch layer 12', a bonding layer 13', a flexible circuit board 15', a polarizer 16' and a cover plate 18'. The bonding layer 13' is connected to the touch layer 12' by a metal wire 14', and the flexible circuit board 15' is connected to the bonding layer 13'. The polarizer 16' is provided with a notch 160' (as shown in FIG. 1b) exposing the flexible circuit board 15' and a portion of the metal wire 14'. The cover plate 18' comprises a transparent window area 181' and a shielding area 182' around the transparent window area 181'. The shielding area 182' may shield wires and structures inside the touch display device outside an effective display area, so that the front panel of the touch display device has a clean and uniform appearance.

Figure 1C:
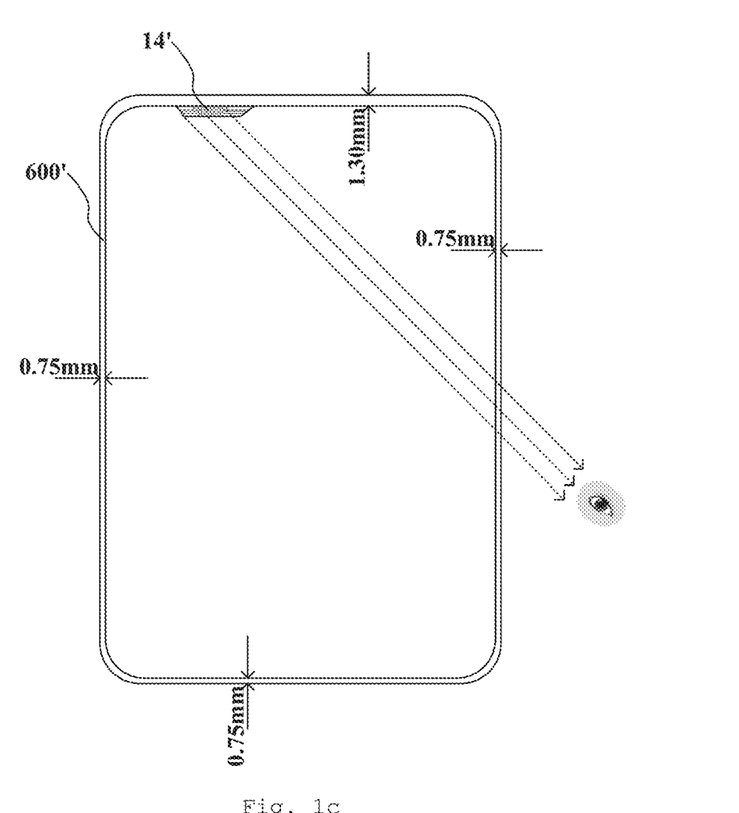
FIG. 1c is a schematic diagram showing that a touch display device in a related art has a light reflection defect of a metal wire.

As shown in FIG. 1c, in order to realize a full-screen design, the touch display device in the related art uses a narrow frame design, with an extremely narrow design in the size of a frame 600'. Here, the frame 600' may be understood as an edge portion of a front of the display device except the effective display area. In the related art, widths of a left edge, a right edge, and a lower edge of the frame 600' are respectively 0.75 millimeter (mm), and a width of an upper edge of the frame 600' is 1.30 mm. The forgoing flexible circuit board 15' is disposed at the upper edge of the touch display device.

However, as shown in FIG. 1c, in the related art, at the upper edge of the touch display device, the metal wire 14' that is reflective is apparently visible for human eye, which seriously affects a visual effect of the product and reduces the product quality. When the touch display device is in a screen off state and the screen is black, the metal wire has a more apparent reflection problem.

In order to solve the above-described technical problems, embodiments of the present disclosure provide a touch screen, a manufacturing method thereof, and a touch display device.

Figure 2A:
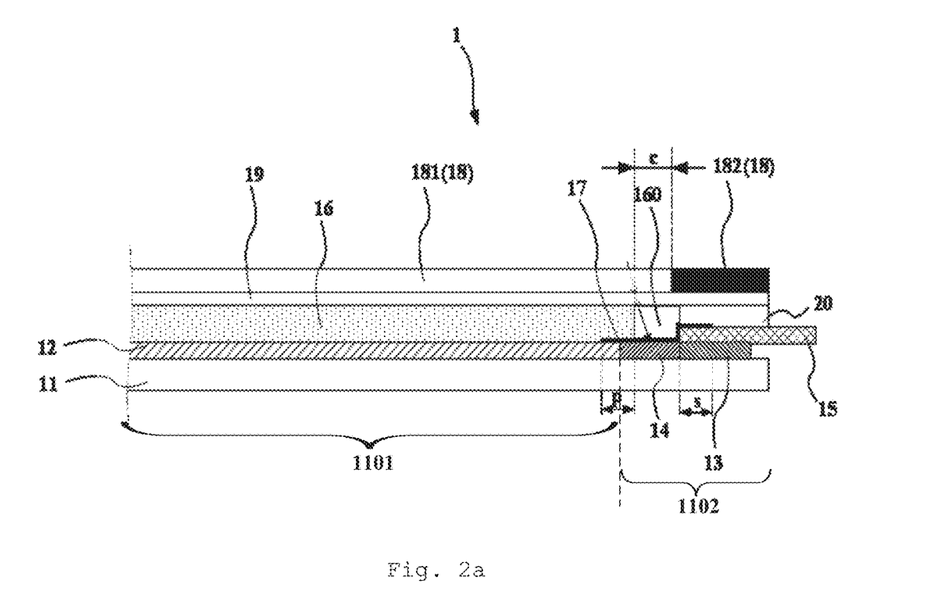
FIG. 2a is a partial cross-sectional schematic view of a touch screen according to an embodiment of the present disclosure.
Figure 2B:
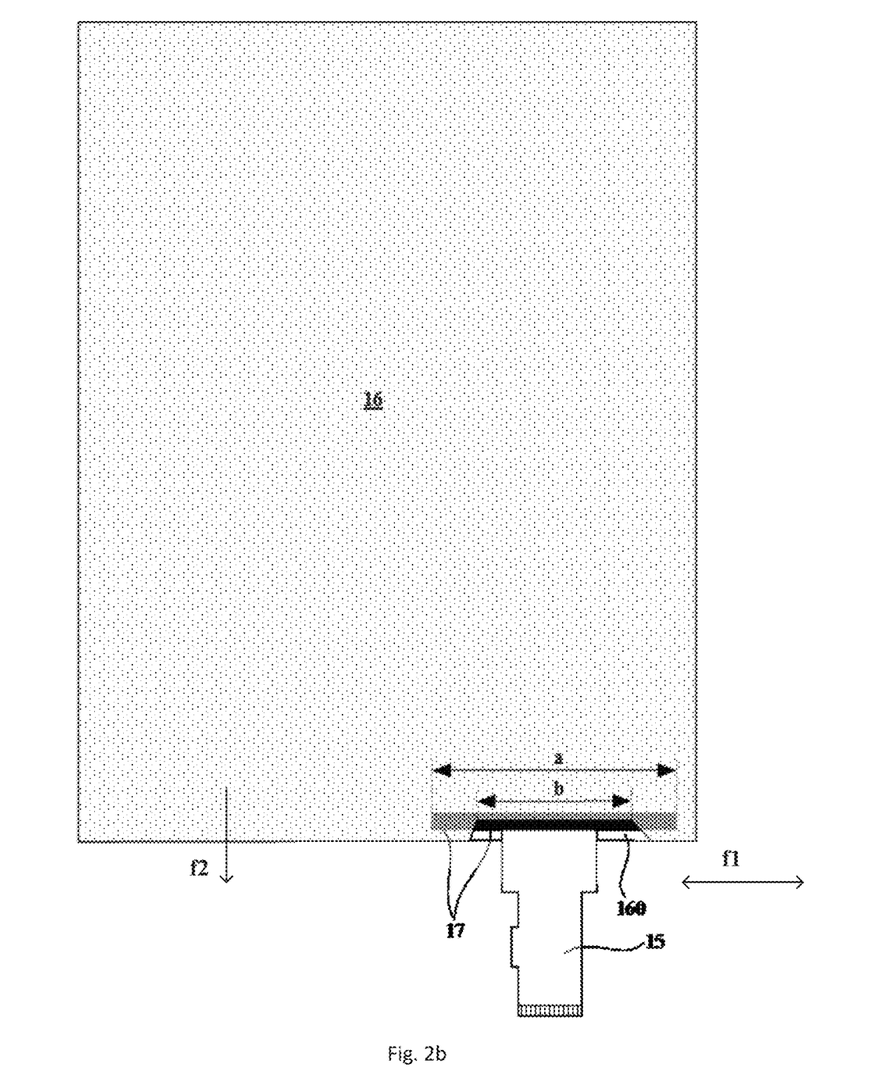
FIG. 2b is a schematic diagram showing that an insulating light-shielding strip is exposed by a notch of a polarizer of a touch display device according to an embodiment of the present disclosure.
Figure 2C:
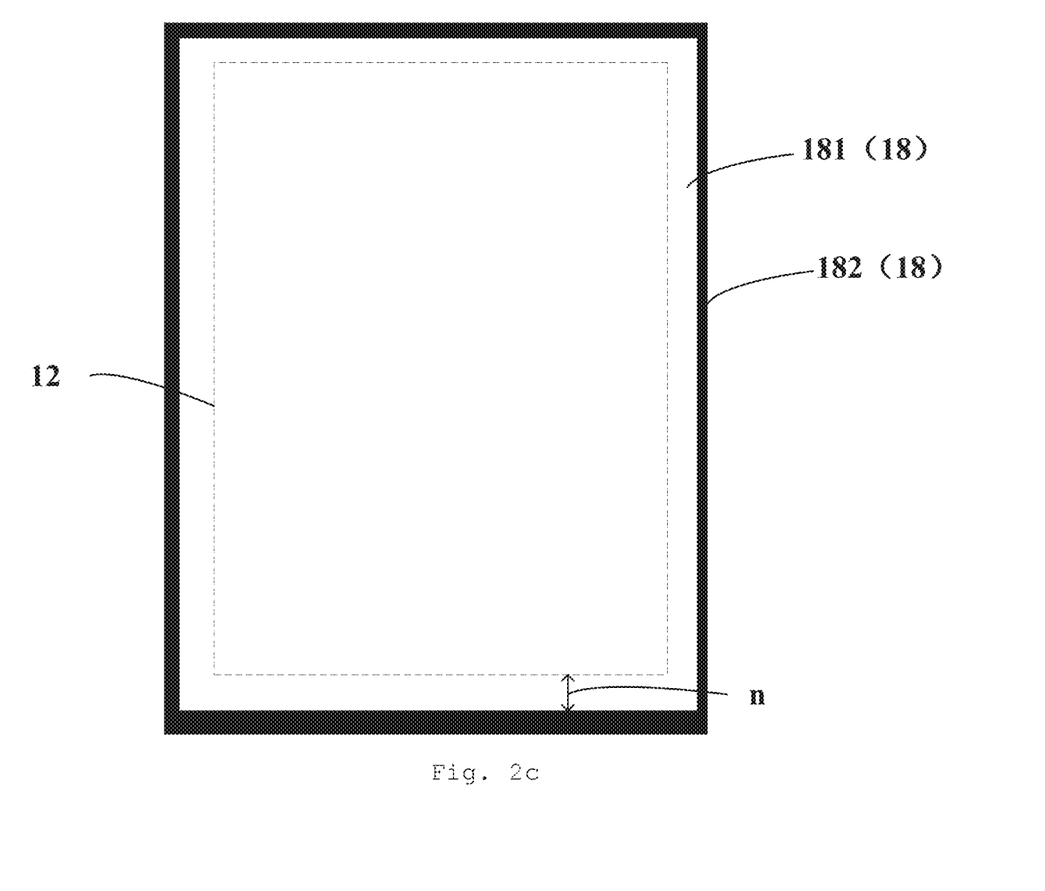
FIG. 2c is a top view of a touch screen according to an embodiment of the present disclosure.

As shown in FIGS. 2a and 2b, a touch screen 1 provided by an embodiment of the present disclosure comprises: a substrate 11; a touch layer 12 and a bonding layer 13 that are on a side of the substrate 11, wherein the bonding layer 13 is connected to the touch layer 12 by a metal wire 14; a flexible circuit board 15 connected to the bonding layer 13; a polarizer 16 on a side of the touch layer 12 away from the substrate 11 and provided with a notch 160 exposing the bonding layer 13 and at least a portion of the metal wire 14; an insulating light-shielding strip 17 covering the at least a portion of the metal wire 14 exposed by the notch 160 and extending to a side of the polarizer 16 close to the substrate 11; and a cover plate 18 on a side of the polarizer 16 away from the substrate 11 and comprising a transparent window area 181 and a shielding area 182 around the transparent window area 181. An orthographic projection of the touch layer 12 on the cover plate 18 is in the transparent window area 181. There is provided with a gap n between the orthographic projection and the shielding area 182, as shown in FIG. 2c. The insulating light-shielding strip 17 comprises a portion exposed by the gap.

In embodiments of the present disclosure, a material type of the substrate 11 is not limited. For example, the substrate 11 may be a glass substrate, a resin substrate, a cyclo olefin polymer (COP) substrate, a polyimide (PI) substrate, or the like. As shown in FIG. 2a, the substrate 11 comprises a touch area 1101 and a non-touch area 1102 on at least one side of the touch area 1101. The touch layer 12 is on the touch area 1101, the bonding layer 13 is on the non-touch area 1102, and the metal wire 14 extends from the touch area 1101 to the non-touch area 1102. A structure of the touch layer 12 is not limited. For example, the touch layer 12 may be a mutual capacitance touch layer designed based on the mutual capacitance principle, or a self-capacitance touch layer designed based on the self-capacitance principle. The bonding layer 13 is configured to connect the flexible circuit board 15 in a bonding manner. The metal wire 14 connecting the bonding layer 13 to the touch layer 12 is not limited to a specific material type, and for example, may comprise at least one of silver, copper, molybdenum, tungsten, chromium, or other materials.

The polarizer 16 only allows light whose polarization direction is parallel to a polarization direction of the polarizer to pass through the polarizer, thereby obtaining light with a single polarization direction, so as to improve the display effect under different viewing angles. A specific type of the polarizer 16 is not limited. For example, in an embodiment, the polarizer 16 is a circular polarizer, which may reduce a reflection phenomenon of touch electrodes in the touch layer 12. In embodiments of the present disclosure, since the flexible circuit board 15 needs to be connected to the bonding layer 13, in order to avoid structural interference and enable the polarizer 16 to be closely attached to the touch layer 12, a notch 160 is provided on an edge of the polarizer 16, and the notch 160 exposes the bonding layer 13 and a portion of the metal wire 14. For example, as shown in FIG. 2b, a width of the notch 160 in a length direction f1 of the insulating light-shielding strip 17 gradually increases along a direction f2 from the touch area 1101 to the non-touch area 1102. Here, the length direction f1 of the insulating light-shielding strip 17 refers to a direction from one end of the insulating light-shielding strip to the other end of the insulating light-shielding strip, and the length direction f1 is perpendicular to the direction f2 from the touch area 1101 to the non-touch area 1102.

In order to meet the design need of a narrow frame, as shown in FIG. 2a, the orthographic projection of the touch layer 12 on the cover plate 18 is in the transparent window area 181, and there is provided with a gap between the orthographic projection and the shielding area 1822. That is, the transparent window area 181 of the cover plate 18 is designed to be slightly larger than the touch layer 12 of the touch screen. Since factors such as a manufacturing tolerance of the polarizer 16, a registration tolerance of the polarizer 16 and the touch layer 12, a manufacturing tolerance of the shielding area 182 of the cover plate 18, and a registration tolerance of the cover plate 18 and the polarizer 16 are inevitable, after the assembling of the touch screen 1 is completed, a gap c is formed between an edge of the orthographic projection of the polarizer 16 on the cover plate 18 and the inner edge of the shielding area 182.

In the related art, as shown in FIG. 1a, due to the presence of the above-described gap, the reflection of the metal wire 14' is apparently visible for human eye at the notch 160' of the polarizer 16'. That is, the metal wire 14' is seen. This seriously affects a visual effect of the product and reduces the quality of the product. Especially when the touch display device is in a screen off state and the screen is black, the reflection of the metal wire 14' is more prominent.

In the above-described embodiment of the present disclosure, the insulating light-shielding strip 17 is provided on a side of the metal wire 14 away from the substrate 11 and covers the portion of the metal wire 14 exposed by the notch 160, so as to absorb incident light and prevent the metal wire 14 from being seen by human eyes. Therefore, the technical solution of the embodiments of the present disclosure can solve the reflection problem of the metal wire at the notch of the polarizer and improve the quality of the product.

In the embodiments of the present disclosure, a specific material type of the insulating light-shielding belt 17 is not limited and may be an organic material or an inorganic material. For example, the insulating light-shielding strip 17 may use a resin material doped with carbon black particles.

In some embodiments of the present disclosure, a material of the insulating light-shielding strip 17 is black ink. The insulating light-shielding strip 17 is formed by an inkjet printing process. The inkjet printing process has a high pattern accuracy, which may reach ±0.2 mm, with a favorable uniformity in a thickness of the formed film layer. The inkjet printing process is used to form the insulating light-shielding tape 17, which can completely cover the metal wire 14 in the predetermined area. In the embodiments of the present disclosure, a thickness of the insulating light-shielding strip 17 may be 1 mm to 2 mm. The thickness of the insulating light-shielding strip 17 is within the range, so that the inkjet printing process has a favorable ink infiltrating property and a favorable uniformity in the thickness, which is more favorable for improving the pattern accuracy.

As shown in FIGS. 2a and 2b, in some embodiments of the present disclosure, one long side of the insulating light-shielding strip 17 extends to a side of the polarizer 16 close to the substrate 11, and another long side of the insulating light-shielding strip 17 extends to a side of the flexible circuit board 15 away from the substrate 11. Along a width direction of the insulating light-shielding strip 17 (that is, the direction from the touch area to the non-touch area), a width p of an overlapping part of the insulating light-shielding strip 17 and the polarizer 16 and a width s of an overlapping part of the insulating light-shielding strip 17 and the flexible circuit board 15 may be designed to be 150 micrometers to 200 micrometers. With this design, the dimensional accuracy and position accuracy of the insulating light-shielding strip 17 are more easily controlled, and the process cost can be reduced on the premise that the metal wire 14 in the predetermined area is completely covered. In addition, the above-mentioned size design may minimize the width of the frame.

In some embodiments, along the direction from the touch area 1101 to the non-touch area 1102, the width of the overlapping part of the insulating light-shielding strip 17 and the polarizer 16 is equal to the width of the overlapping part of the insulating light-shielding strip 17 and the flexible circuit board 15.

As shown in FIG. 2b, in some embodiments, a length a of the insulating light-shielding strip 17 is greater than a length b of a bottom edge of the notch 160. After the polarizer 16 is attached to the touch layer, the portion of insulating light-shielding strip 17 exposed by the notch 160 extends from one side edge of the notch 160 to the other side edge of the notch 160.

Figure 3:
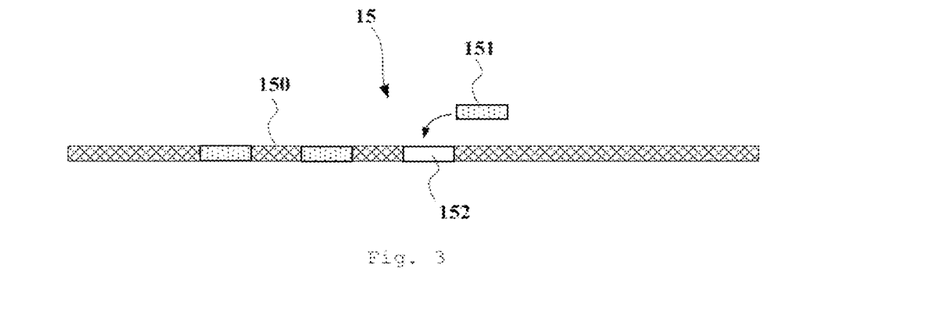
FIG. 3 is a schematic cross-sectional view of a flexible circuit board of a touch screen according to an embodiment of the present disclosure.

In order to meet the design needs of the narrow frame of the touch display device, in some embodiments of the present disclosure, as shown in FIG. 3, the flexible circuit board 15 comprises a board body 150 with a hollow hole 152 and a liquid photo solder resist 151 (an acrylic oligomer) filled in the hollow hole 152. The design of the hollow hole 152 in the board body 150 of the flexible circuit board 15 may not only improve the flexibility of the flexible circuit board 15 and reduce its bending radius (which may reach 0.2 mm at a minimum), but also be not likely to produce wrinkles, so that the flexible circuit board 15 is easily bent, and when the flexible circuit board 15 is applied to the touch display device product, the size of the frame of the touch display device may be further reduced.

As shown in FIG. 2a, in some embodiments of the present disclosure, the touch screen 1 further comprises: an adhesive film 19 between the polarizer 16 and the cover plate 18, and a support pad 20 between the flexible circuit board 15 and the adhesive film 19. The adhesive film 19 may made of UV light curing adhesive such as an optically clear adhesive (OCA), to connect the structures on both sides. The support pad 20 plays a role of supporting and spacing between the flexible circuit board 15 and the adhesive film 19, and the support pad 20 may be made of an adhesive material.

In some embodiments of the present disclosure, the flexible circuit board 15 may be connected to the bonding layer 13 by an anisotropic conductive film (ACF). The anisotropic conductive adhesive is a transparent high-molecular bonding material with adhesive, conductive, and insulative properties, and with such a remarkable feature as to be conductive in a longitudinal direction but insulative in a lateral direction.

Figure 4:
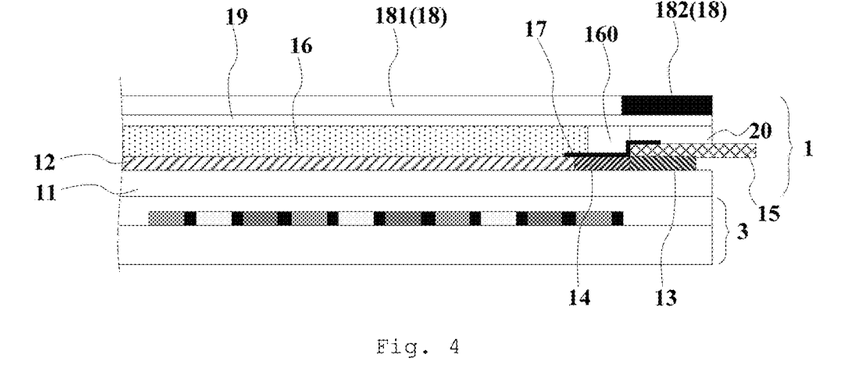
FIG. 4 is a partial cross-sectional schematic view of a touch display device according to an embodiment of the present disclosure.

As shown in FIG. 4, embodiments of the present disclosure further provide a touch display device comprising: the touch screen 1 according to any of the foregoing embodiments, and a display screen 3 attached to the substrate 11 of the touch screen 1. The display screen 3 may be a liquid crystal display screen or an organic light emitting display screen. The display screen 3 may be connected to the touch screen 1 by an adhesive layer. A product type of the touch display device is not limited. For example, the touch display device may be a mobile phone, a tablet computer, an information interactive screen, a smart wearable device, a vehicle-mounted navigation device or the like.

Figure 8:
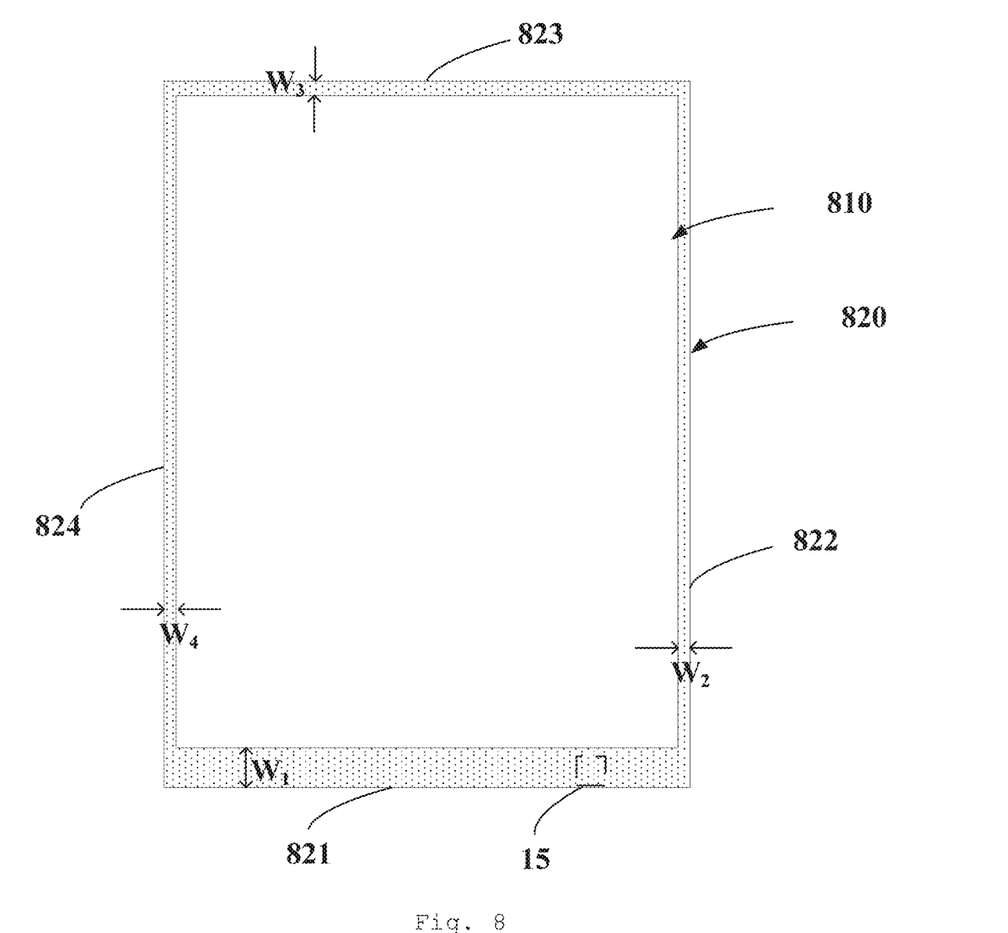
FIG. 8 is a top view of a touch display device according to an embodiment of the present disclosure.

FIG. 8 is a top view of a touch display device according to an embodiment of the present disclosure.

In some embodiments, as shown in FIG. 8, the touch display device comprises a display area 810 and a non-display area 820 around the display area 810. The non-display area 820 comprising: a first part 821, a second part 822 adjacent to the first part 821, a third part 823 opposite to the first part 821, and a fourth part 824 opposite to the second part 822. The flexible circuit board 15 is provided on the first part 821. A width $W_1$ of the first part 821 is larger than a width of any one of the second part 822, the third part 823, or the fourth part 824. For example, the width $W_2$ of the second part 822 is equal to the width $W_3$ of the third part 823 and equal to the width $W_4$ of the fourth part 824.

Figure 5:
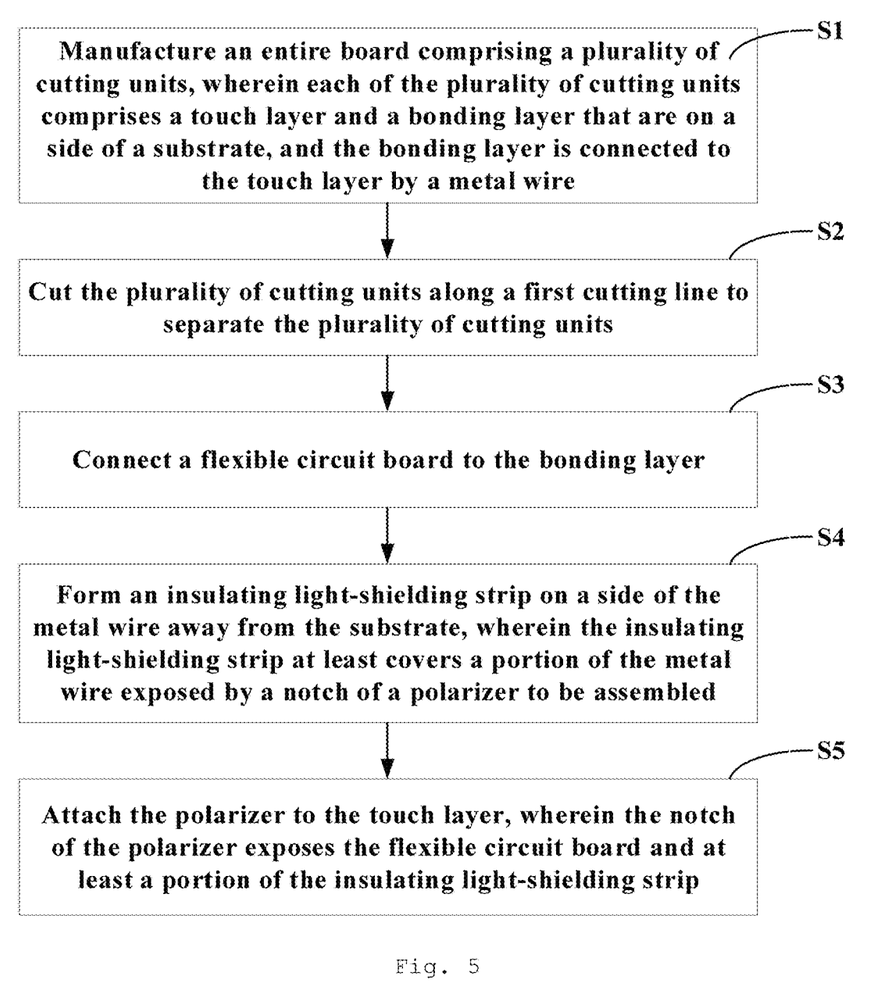
FIG. 5 is a flowchart of a manufacturing method for a touch screen according to an embodiment of the present disclosure.

As shown in FIG. 5, embodiments of the present disclosure also provide a manufacturing method for a touch screen, the manufacturing method comprising the following steps S1 to S5.

Step S1: an entire board comprising a plurality of cutting units is manufactured. The cutting unit comprises a touch layer and a bonding layer that are on a side of a substrate. The bonding layer is connected to the touch layer by a metal wire.

Step S2: the plurality of cutting units is cut along a first cutting line to separate the plurality of cutting units.

Step S3: a flexible circuit board is connected to the bonding layer.

Step S4: an insulating light-shielding strip is formed on a side of the metal wire away from the substrate, wherein the insulating light-shielding strip at least covers a portion of the metal wire exposed by a notch of a polarizer to be assembled.

Step S5: the polarizer is attached to the touch layer, wherein the notch of the polarizer exposes the flexible circuit board and at least a portion of the insulating light-shielding strip.

With reference to the foregoing analysis on the advantageous effects of the touch screen, since the touch display device uses the touch screen manufactured according to the above-described manufacturing method, and the insulating light-shielding strip covers a portion of the metal wire exposed by the notch, it is possible to avoid that the metal line is visible for human eye, thereby improving the quality of the product.

Figure 6A:
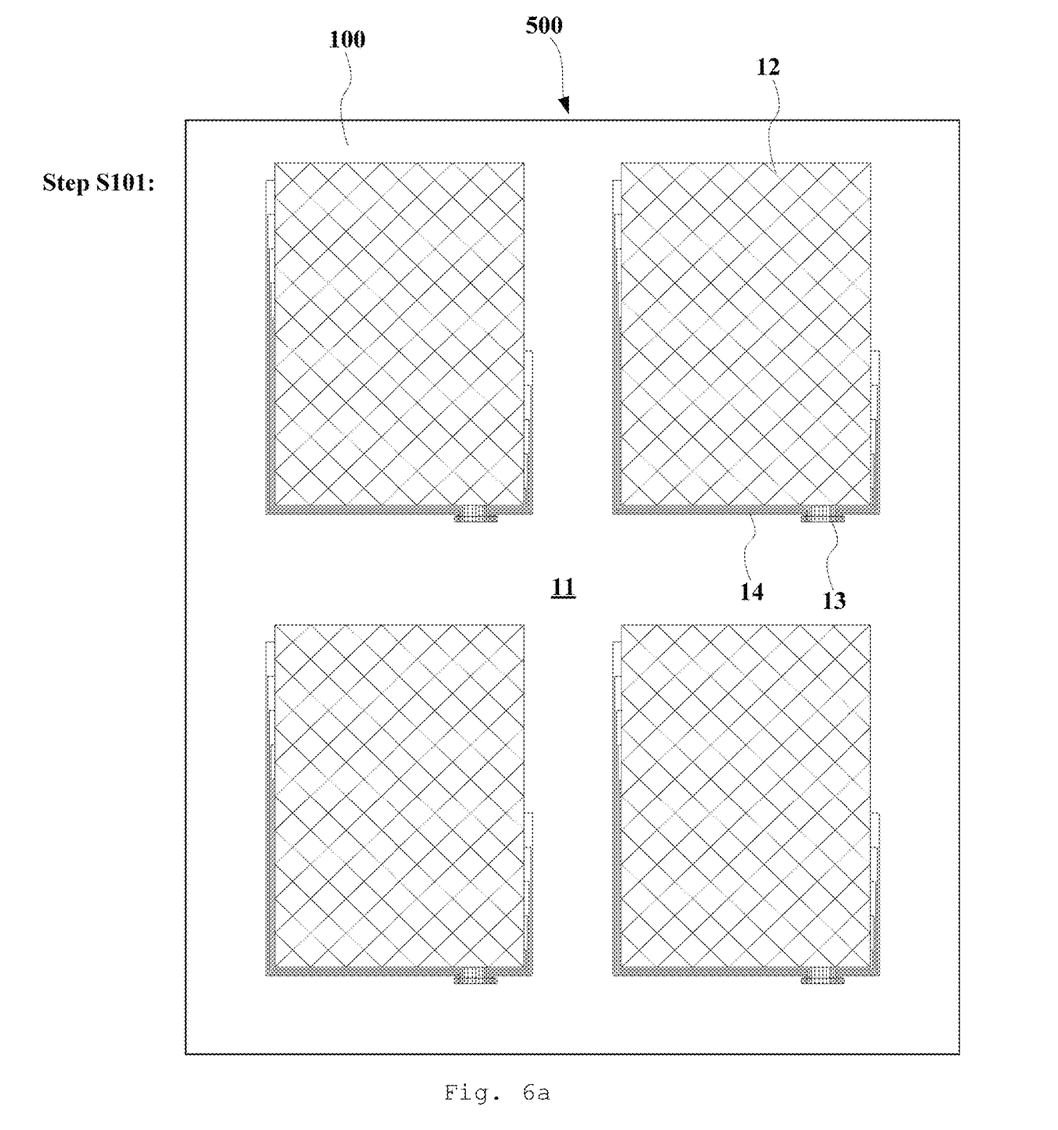
FIG. 6a is a schematic view of a structure after completing step S101 in a manufacturing method for a touch screen according to another embodiment of the present disclosure.
Figure 6B:
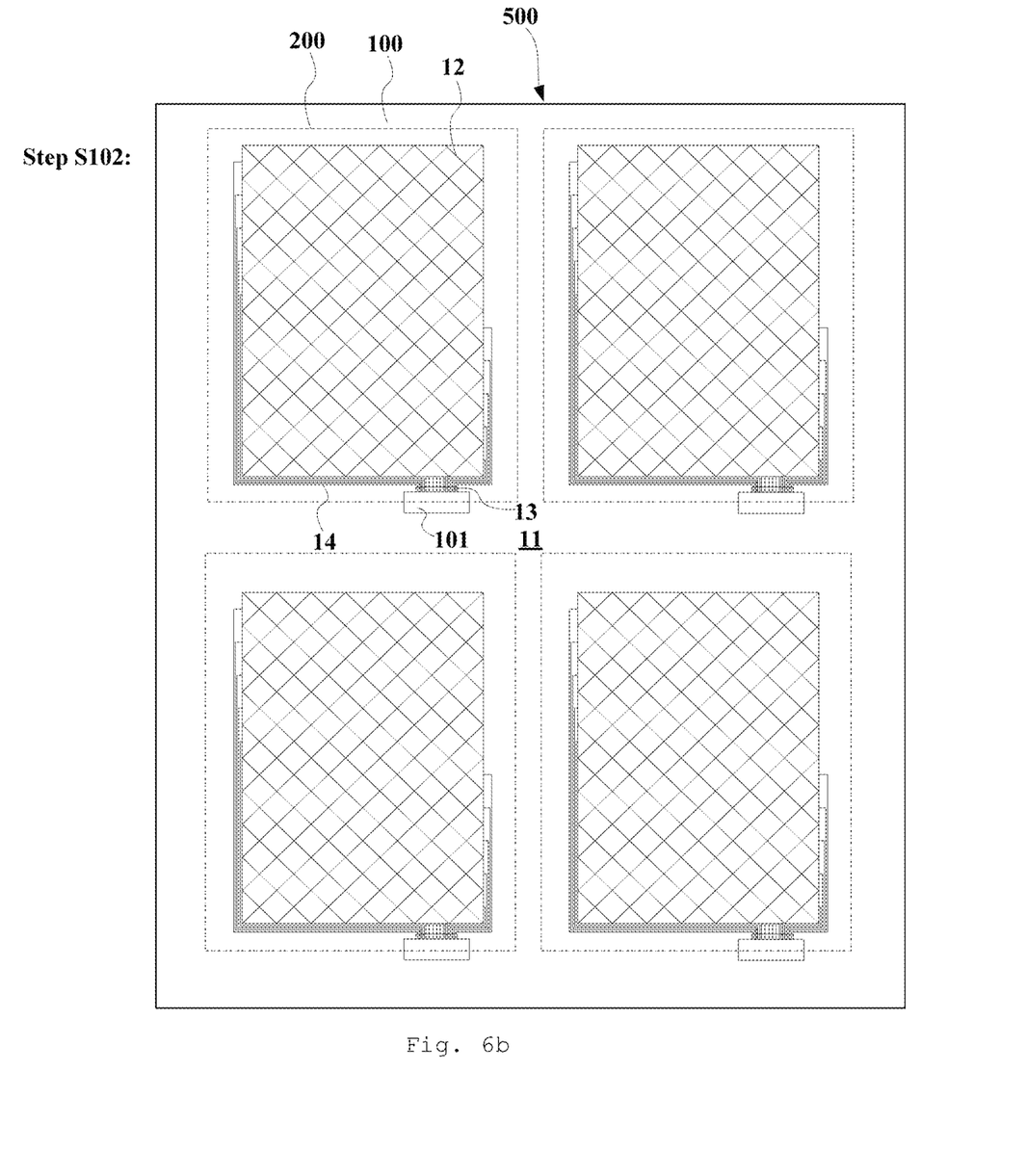
FIG. 6b is a schematic view of a structure after completing step S102 in a manufacturing method for a touch screen according to another embodiment of the present disclosure.
Figure 6C:
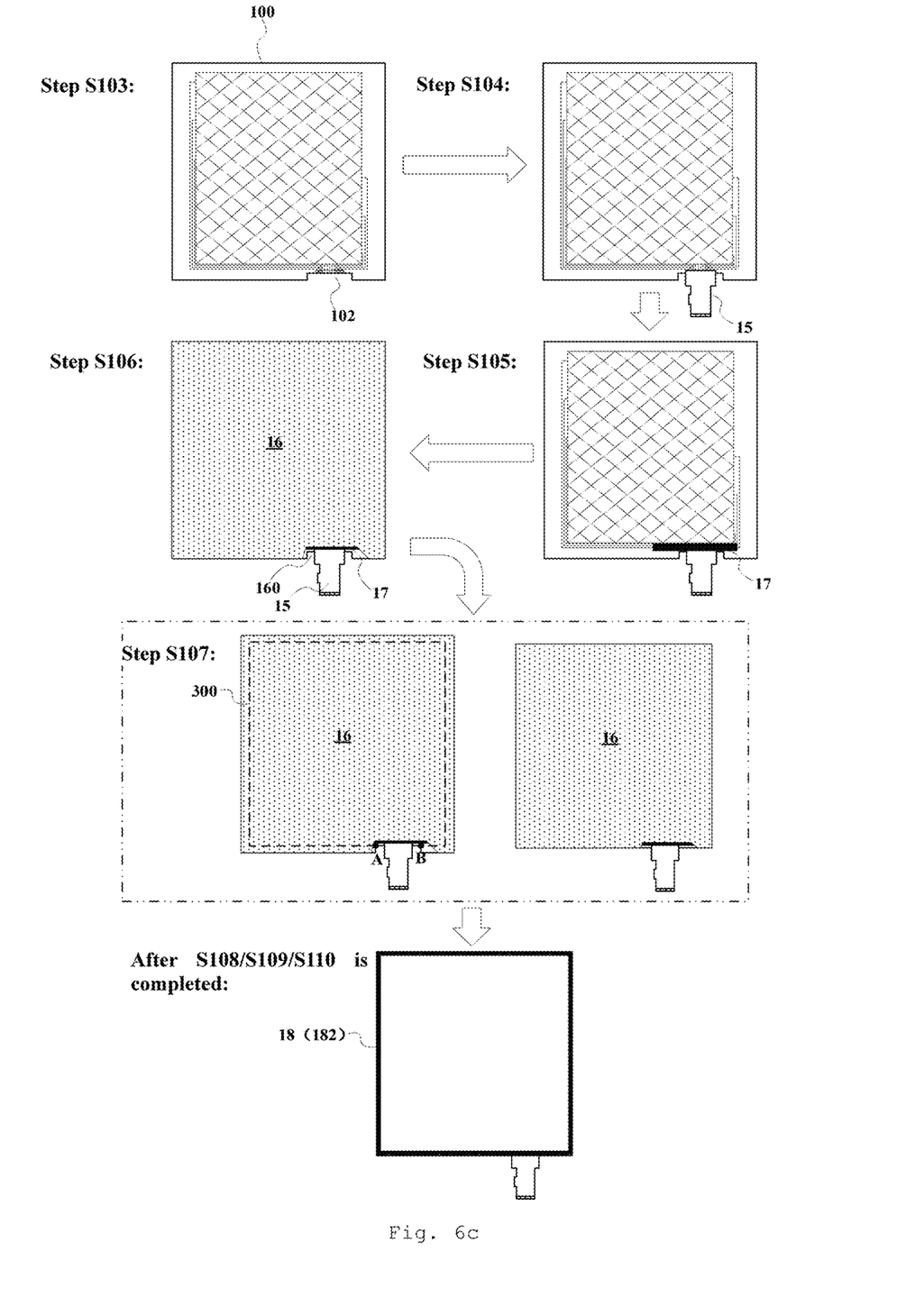
FIG. 6c is a schematic view of structures of steps S103 to S110 of a manufacturing method for a touch screen according to another embodiment of the present disclosure.

FIGS. 6a, 6b and 6c are schematic views of a manufacturing procedure of a touch screen provided by an embodiment of the present disclosure. The manufacturing procedure of the touch screen comprises the following steps S101 to S110.

As shown in FIG. 6a, at step S101, an entire board 500 comprising a plurality of cutting units 100 is manufactured. The cutting unit 100 comprises a touch layer 12 and a bonding layer 13 on a side of the substrate 11. The bonding layer 13 is connected to the touch layer 12 by a metal wire 14.

As shown in FIG. 6b, at step S102, a punching hole 101 is formed on a side of the bonding layer 13 of each cutting unit 100 away from the touch layer 12. For example, a shape of the punching hole 101 is square.

At step S103, the plurality of cutting units 100 is cut along a first cutting line 200 shown in FIG. 6b to separate the plurality of cutting units 100, wherein the first cutting line 200 passes through the punching hole 101. As shown in FIG. 6c, after step S103 is completed, an opening groove 102 is formed at the punching hole.

As shown in FIG. 6c, at step S104, a flexible circuit board 15 is connected to the bonding layer. For example, the flexible circuit board 15 is connected to the bonding layer by an anisotropic conductive adhesive. By selecting a suitable temperature, time and pressure parameter, a curing rate of the anisotropic conductive adhesive reaches 75%, and the drawing force of the flexible circuit board 15 is greater than 50 gf/cm, so as to implement reliably connecting the flexible circuit board 15 to the bonding layer.

As shown in FIG. 6c, at step S105, an insulating light-shielding strip 17 is formed on a side of the metal wire away from the substrate. The insulating light-shielding strip 17 at least covers a portion of the metal wire exposed by a notch of a polarizer to be assembled and may extend to below the polarizer to be assembled, so as to partially overlap with the polarizer to be assembled in a direction perpendicular to the substrate. The insulating light-shielding strip 17 may be formed by an inkjet printing process.

Referring to FIGS. 2a and 2b, in some embodiments, at the step, the size and position of the insulating light-shielding strip 17 are designed such that a length a of the insulating light-shielding strip 17 is greater than a length b of a bottom edge of the notch 160 of the polarizer 16, and as shown in FIG. 2a, along a width direction of the insulating light shielding strip 17, a width p of an overlapping part of the insulating light-shielding strip 17 and the polarizer 16 is 150 micrometers to 200 micrometers, and a width s of an overlapping part of the insulating light-shielding strip 17 and the flexible circuit board 15 is 150 micrometers to 200 micrometers.

As shown in FIG. 6c, at step S106, the polarizer 16 is attached to the touch layer, wherein the notch 160 of the polarizer 16 exposes the flexible circuit board 15 and at least a portion of the insulating light-shielding strip 17. Since the insulating light-shielding strip 17 covers the metal wire in the notch 160, the metal wire in the notch 160 may not be seen.

As shown in FIG. 6c, at step S107, the cutting unit is cut again along a second cutting line 300, wherein a starting point A of the second cutting line 300 is set at one end of a bottom edge of the opening groove 102 formed at step S103, and an ending point B of the second cutting line 300 is set at another end of the bottom edge of the opening groove 102 formed at step S103. It may be understood that, the positions of the starting point A and the ending point B may be interchanged.

After the cutting, a width of an edge of a non-effective area around the touch layer is further reduced to meet the design requirements of a narrow frame of the touch display device. a contour shape of the cutting unit after the cutting is a contour shape of the final touch screen. After the cutting, the step shape formed at step S103 no longer exists, and only the bottom edge of the opening groove remains.

At step S108, a support pad is attached to the flexible circuit board.

At step S109, an adhesive film is attached to the polarizer and the support pad.

At step S110, a cover plate is attached to the adhesive film.

The touch display device uses the touch screen manufactured according to the above-described manufacturing method, which not only may avoid that the metal wire is visible for human eye, but also can reduce the size of the frame of the touch display device, thereby improving the quality of the product.

In one comparative example related to the present disclosure, during the manufacturing process of the touch screen, the polarizer is first attached to the touch layer, and then the flexible circuit board is connected to the bonding layer, and then a light-shielding ink of an insulating material is filled in a gap between the polarizer and the flexible circuit board using an injection manner by a syringe. Due to a capillary action of the light-shielding ink in a liquid state, the method of the comparative example may result in problems such as ink overflow, insufficient infiltration, and poor uniformity in the thickness of the film, so that the metal wire exposed by the notch of the polarizer may not be effectively shielded, and the reflection problem of the metal wire may not be completely solved. In addition, in the method of the comparative example, because the step of bonding the flexible circuit board with the bonding layer is performed after the polarizer is attached to the touch layer, the bonding stress might cause the problem of bubbles between the polarizer and the touch layer.

In the manufacturing procedure of the above-described embodiment of the present disclosure, the flexible circuit board is first connected to the bonding layer, and then the insulating light-shielding strip is formed by the inkjet printing process, and then the polarizer is attached to the touch layer. The inkjet printing process of the insulating light-shielding strip is performed before the polarizer is attached to the touch layer. In this way, the light-shielding ink may be fully extended, for example, to an area to overlap with the polarizer, so that the metal wire in a predetermined area may be completely covered. The insulating light-shielding strip formed by the inkjet printing process has a better uniformity in thickness and a higher accuracy in pattern. In addition, the step of bonding the flexible circuit board with the bonding layer is performed before the polarizer is attached to the touch layer, which may effectively reduce the problem of bubbles between the polarizer and the touch layer.

In some embodiments of the present disclosure, between steps S108 and S109, a step of defoaming the polarizer and the touch layer that are attached to each other may also be added. For example, the polarizer and the touch layer that are attached to each other are defoamed by using a vacuum defoaming process.

Figure 7:
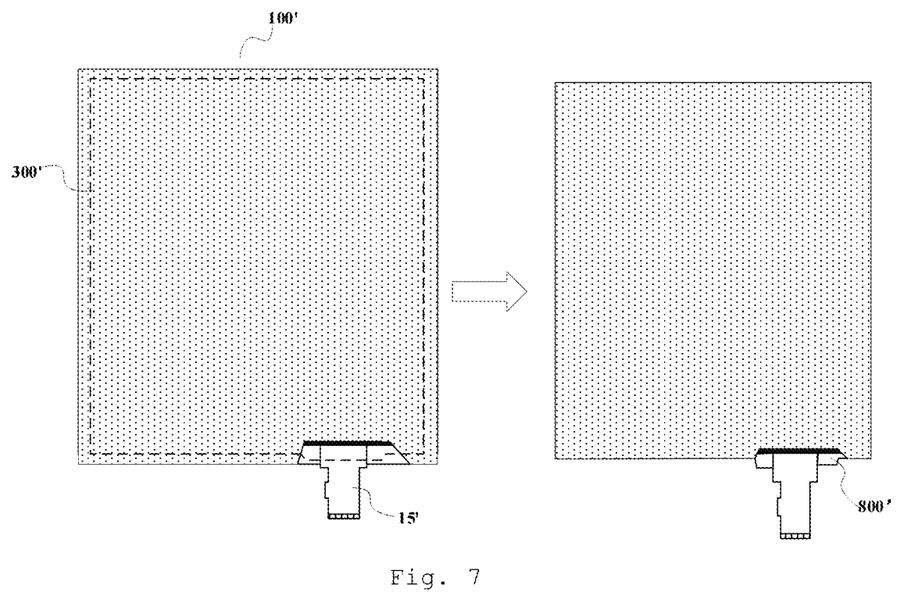
FIG. 7 is a schematic diagram of a step in an edge of a comparative example provided by the present disclosure after cutting.

In another comparative example related to the present disclosure, during the manufacturing procedure of the touch screen, the punching 101 is not formed in the cutting unit 100 with reference to step S102. As shown in FIG. 7, during cutting the cutting unit 100' for the second time, since the flexible circuit board 15' has been connected to the bonding layer, in order to avoid that the flexible circuit board 15' is cut, the connection root of the flexible circuit board 15' and the bonding layer needs to be spaced a certain distance from a cutting line 300', which results in that a step 800' is produced at the edge of the cutting unit after the cutting is completed. In the manufacturing method for the comparative example, since the unnecessary step 800' is produced, the size of the frame is increased, which is not favorable for realizing a narrow frame.

In step S102 of the above-described embodiment of the present disclosure, as shown in FIGS. 6b and 6c, a punching hole 101 is formed in advance, and the first cutting line 200 during the first cutting passes through the punching hole 101, thereby forming the opening groove 102 at the punching hole of the cutting unit; the starting point A of the second cutting line 300 during the second cutting is located at one end of the bottom edge of the opening groove 102, and the ending point B is located at the other end of the bottom edge of the opening groove 102. Since the starting point A and the ending point B of the second cutting line 300 are on both sides of the flexible circuit board 15, the second cutting may not be interfered by the flexible circuit board 15, thereby avoiding that the step 800' in the comparative example shown in FIG. 7 is produced. The size of the frame of the touch display device may be designed to be smaller.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments or equivalently substitution of a portion of the technical features may be made without departing from the scope and spirit of the present disclosure. The scope of the present disclosure is defined by the appended claims.

What is claimed is:

1. A touch screen, comprising:
   a substrate;
   a touch layer and a bonding layer that are on a side of the substrate, wherein the bonding layer is connected to the touch layer by a metal wire;
   a flexible circuit board connected to the bonding layer;
   a polarizer on a side of the touch layer away from the substrate and provided with a notch exposing the bonding layer and at least a portion of the metal wire;
   an insulating light-shielding strip covering the at least a portion of the metal wire exposed by the notch and extending to a side of the polarizer close to the substrate; and
   a cover plate on a side of the polarizer away from the substrate and comprising a transparent window area and a shielding area around the transparent window area,
   wherein an orthographic projection of the touch layer on the cover plate is in the transparent window area, there is provided with a gap between the orthographic projection and the shielding area, and the insulating light-shielding strip comprises a portion exposed by the gap,
   wherein the substrate comprises a touch area and a non-touch area on at least one side of the touch area, the touch layer is on the touch area, the bonding layer is on the non-touch area, and the metal wire extends from the touch area to the non-touch area, and
   wherein a width of the notch in a length direction of the insulating light-shielding strip gradually increases along a direction from the touch area to the non-touch area.

2. The touch screen according to claim 1, wherein a material of the insulating light-shielding strip comprises black ink.

3. The touch screen according to claim 1, wherein the insulating light-shielding strip further extends to a side of the flexible circuit board away from the substrate.

4. The touch screen of claim 3, wherein a length of the insulating light-shielding strip is greater than a length of a bottom edge of the notch.

5. The touch screen according to claim 1, wherein:
   along a direction from the touch area to the non-touch area, a width of an overlapping part of the insulating light-shielding strip and the polarizer is 150 micrometers to 200 micrometers, and a width of an overlapping part of the insulating light-shielding strip and the flexible circuit board is 150 micrometers to 200 micrometers.

6. The touch screen according to claim 5, wherein along the direction from the touch area to the non-touch area, the width of the overlapping part of the insulating light-shielding strip and the polarizer is equal to the width of the overlapping part of the insulating light-shielding strip and the flexible circuit board.

7. The touch screen according to claim 1, wherein a thickness of the insulating light-shielding strip is 1 millimeter to 2 millimeters.

8. The touch screen according to claim 1, further comprising:
   an adhesive film between the polarizer and the cover plate, and
   a support pad between the flexible circuit board and the adhesive film.

9. The touch screen according to claim 8, wherein the flexible circuit board comprises:
   a board body with a hollow hole, and
   a liquid photo solder resist filled in the hollow hole.

10. A touch display device, comprising:
    the touch screen according to claim 1, and
    a display screen attached to the substrate of the touch screen.

11. The touch display device according to claim 10, wherein:
- the touch display device comprises a display area and a non-display area around the display area; and
- the non-display area comprising: a first part, a second part adjacent to the first part, a third part opposite to the first part, and a fourth part opposite to the second part, wherein the flexible circuit board is provided on the first part, and a width of the first part is larger than a width of any one of the second part, the third part, or the fourth part.

12. The touch display device according to claim 11, wherein the width of the second part is equal to the width of the third part and equal to the width of the fourth part.

13. A manufacturing method for a touch screen, comprising:
- manufacturing an entire board comprising a plurality of cutting units, wherein each of the plurality of cutting units comprises a touch layer and a bonding layer that are on a side of a substrate, and the bonding layer is connected to the touch layer by a metal wire;
- cutting the plurality of cutting units along a first cutting line to separate the plurality of cutting units;
- connecting a flexible circuit board to the bonding layer;
- forming an insulating light-shielding strip on a side of the metal wire away from the substrate, wherein the insulating light-shielding strip at least covers a portion of the metal wire exposed by a notch of a polarizer to be assembled; and
- attaching the polarizer to the touch layer, wherein the notch of the polarizer exposes the flexible circuit board and at least a portion of the insulating light-shielding strip;
- wherein the substrate comprises a touch area and a non-touch area on at least one side of the touch area, the touch layer is on the touch area, the bonding layer is on the non-touch area, and the metal wire extends from the touch area to the non-touch area, and
- wherein a width of the notch in a length direction of the insulating light-shielding strip gradually increases along a direction from the touch area to the non-touch area.

14. The manufacturing method according to claim 13, wherein the insulating light-shielding strip is formed by an inkjet printing process.

15. The manufacturing method according to claim 13, further comprising:
- forming a punching hole on a side of the bonding layer of each of the plurality of cutting units away from the touch layer before cutting the plurality of cutting units along the first cutting line, wherein the first cutting line passes through the punching hole to form an opening groove at the punching hole of each of the plurality of cutting units.

16. The manufacturing method according to claim 15, wherein the punching hole is a square hole, and the manufacturing method further comprises:
- cutting the each of the plurality of cutting units along a second cutting line after attaching the polarizer to the touch layer, wherein a starting point of the second cutting line is at one end of a bottom edge of the opening groove, and an ending point of the second cutting line is at another end of the bottom edge of the opening groove.

17. The manufacturing method according to claim 16, further comprising:
- attaching a support pad to the flexible circuit board after cutting the each of the plurality of cutting units along the second cutting line;
- attaching an adhesive film to the polarizer and the support pad; and
- attaching a cover plate to the adhesive film.

18. The manufacturing method according to claim 17, further comprising:
- defoaming the polarizer and the touch layer that are attached to each other after cutting the each of the plurality of cutting units along the second cutting line and before attaching the adhesive film to the polarizer and the support pad.

* * * * *